United States Patent [19]

Hwang et al.

[11] Patent Number: 5,227,346
[45] Date of Patent: Jul. 13, 1993

[54] SIALON COMPOSITES AND METHOD OF PREPARING THE SAME

[75] Inventors: Chinmau J. Hwang; Donald R. Beaman, both of Midland, Mich.

[73] Assignee: The Dow Chemical Company, Midland, Mich.

[21] Appl. No.: 847,522

[22] Filed: Mar. 6, 1992

[51] Int. Cl.[5] ............................................. C04B 35/58
[52] U.S. Cl. ........................................ 501/96; 501/98
[58] Field of Search .............................. 501/96, 97, 98

[56] References Cited

U.S. PATENT DOCUMENTS

| | | | |
|---|---|---|---|
| 4,506,020 | 3/1985 | Butler et al. | 501/98 X |
| 4,547,470 | 10/1985 | Tanase et al. | 501/98 X |
| 4,563,433 | 1/1986 | Yeckley et al. | 501/97 |
| 4,692,420 | 9/1987 | Oda et al. | 501/97 |
| 4,870,036 | 9/1989 | Yeh | 501/97 |
| 4,880,755 | 11/1989 | Mehtrotra et al. | 501/97 X |
| 5,032,553 | 7/1991 | Tarry | 501/98 X |

FOREIGN PATENT DOCUMENTS 3423911  1/1985  Fed. Rep. of Germany ........ 501/98

*Primary Examiner*—Karl Group

[57] ABSTRACT

This invention is a multi-phase SiAlON composite having a first alpha-SiAlON phase prepared from a multicationic mixture including oxides and nitrides of strontium, at least one of yttrium or a rare earth metal, and at least one other metal such as Ca, Mg, Li or Na. The composite also has a second phase of beta-SiAlON, and a material of a third phase of intergranular amorphous morphology including Si, Al, O, and N combined with a mixture of strontium, at least one of Ca, Mg, Li or Na and at least one of yttrium or a rare earth element. The multi-phase SiAlON exhibits excellent strength, fracture toughness, hardness, creep resistance and oxidation resistance. The material is useful for high wear, high temperature machine or engine components and tools.

20 Claims, No Drawings

SIALON COMPOSITES AND METHOD OF PREPARING THE SAME

TECHNICAL FIELD

This invention relates generally to SiAlON composites and a method of preparing the same but more particularly relates to multi-phase SiAlON materials having at least an alpha-SiAlON phase prepared from a multi-cationic mixture including oxides and nitrides of strontium, where the alpha-SiAlON phase includes fine elongated grains containing strontium, at least one of yttrium or a rare earth metal, and at least one other metal such as Ca, Mg, Li or Na.

BACKGROUND OF THE INVENTION

Ceramic materials made from SiAlON have recently been investigated for high temperature industrial applications due to their excellent properties. High toughness, and elevated temperature strength, along with oxidation resistance have made SiAlON ceramics the perfect candidate for certain applications. Prior art compositions and methods have attempted to rid the SiAlON materials of glass phases incorporated into the material as they have been the typical cause of high temperature degradation. Attempts have been made to remove oxide sintering additives because they form glasses which remain in grain boundaries, and reduce the overall strength of the material.

In an attempt to provide a ceramic SiAlON composition which is usable in high temperature applications, prior art methods and compositions have taught the combination of alpha-SiAlON with beta-SiAlON because the beta-SiAlON contained elongated lath-like microstructures. The beta-SiAlON material is elongated, and therefore adds strength to the material. However, certain residual glass phases were formed in the grain boundaries between the alpha and beta phases when the prior art methods were performed. These residual glasses are undesirable as they have been the typical cause of high temperature degradation as discussed above. One can see that it would be advantageous to provide a multi-phase SiAlON material without the residual glasses.

In addition, strontium was not generally incorporated into the alpha-SiAlON structure in the prior art since it was thought that cationic strontium atoms were too large to fit interstitially into position within the alpha-phase matrix. None of the prior art found in the relevant patent search teaches a multi-phase SiAlON material with an alpha phase which contains strontium and also has elongated lath-like grains.

Various multi-phase SiAlON sintered bodies containing both alpha- and beta-SiAlON are known in the art and are described in the following patents. However, these patents do not teach strontium in the alpha phase.

U.S. Pat. No. 4,880,755 issued to Mehrotra in 1989, discloses a SiAlON ceramic material comprising a ceramic core selected from alpha-SiAlON, beta-SiAlON, and an intergranular phase and, optionally, substantially inert refractory phases. The SiAlON ceramic material has an alloyed surface layer with a substantially increased aluminum and oxygen content.

European Patent Application No. 84302052.0 published Nov. 14, 1984 teaches a mixed phase sintered SiAlON prepared with additions of yttria, alumina and aluminum nitride useful for engine parts. The constituent phases were represented by alpha-SiAlON and beta-SiAlON, wherein the ratio between both phases is set at 0.05–0.7:0.95–0.3, or by an alternative composition comprising alpha-SiAlON, beta-SiAlON and (Si-RE-Al-ON) where RE is a rare earth metal and wherein the ratio of the alpha-SiAlON phase to the whole of all constituent phases is set at 0.01 to 0.7.

In addition to the above-referenced patents which teach SiAlON materials having combinations of alpha and beta-phases, there are a number of patents which teach the use of strontium oxide as a sintering aid and which teach silicon nitride bodies containing strontium. These compositions and methods are set forth in the following patents.

U.S. Pat. No. 4,870,036 issued to Yeh in 1989 teaches an improved silicon nitride material characterized by high mechanical strength at high temperatures comprising a combination of approximately 0.5–6.0 percent by weight of strontium oxide, 2.0 to 12.0 percent by weight of yttrium oxide and the balance silicon nitride. The material is densified by either an encapsulated hot isostatic pressing method or an encapsulated sinter/HIP method and can be utilized to form near net shape articles.

U.S. Pat. No. 4,692,420 issued to Oda in 1987 teaches a silicon nitride sintered body consisting essentially of Mg, Sr, Ce and Al. These compounds are utilized in the form of their respective oxides in combination with the silicon nitride. The silicon nitride sintered body has a low thermal conductivity, while high mechanical strength and high thermal shock resistance are maintained.

Consequently, it would be a great advantage for a material made of SiAlON which would incorporate multiple phases of both alpha-phase and beta-phase SiAlON materials which could also include elongated, lath-like microstructures in both the alpha- and beta-phases. Although we have seen SiAlON materials having both alpha- and beta-phases, as well as seeing silicon nitride bodies containing strontium, it would be advantageous to provide a SiAlON material which includes multiple phases in which the phases also contain strontium.

Therefore, it is a primary object of the present invention to provide a multi-phase SiAlON ceramic material having at least an alpha-SiAlON phase, a beta-SiAlON phase and an amorphous intergranular phase wherein the alpha-SiAlON phase contains strontium and elongated grains in the ceramic material to enhance the strength.

It is another object of the present invention to provide a multi-phase SiAlON ceramic material which exhibits excellent strength and toughness at high temperatures.

SUMMARY OF THE INVENTION

In accordance with preferred embodiments of the invention, these and other objects and advantages are addressed as follows. A SiAlON ceramic material in accordance with the present invention contains a mixture of at least three phases which are: (1) an alpha-SiAlON phase; (2) a beta-SiAlON phase; and (3) an intergranular amorphous phase. The alpha-SiAlON contains strontium and exists as elongated fine grains and fine laths while the beta-SiAlON exists as large laths. The intergranular amorphous phase can be partially crystallized. By adjusting the relative amounts of these three phases, the materials can be tailored to give high hardness, excellent elevated temperature strength, good creep resistance and good oxidation resistance.

Incorporation of strontium in the alpha-SiAlON phase is generally known in the art to be problematic. It has been found to be extremely difficult to incorporate a single strontium-containing component into alpha-SiAlON. However, due to the combination of strontium oxide with other cationic oxides, such as yttria, calcia and the rare earth oxides as taught by the present invention, the strontium went in and was interstitially placed in the alpha-SiAlON material. Although we have observed that: (1) strontium can be interstitially placed into alpha-SiAlON, and (2) we see alpha-SiAlON in lath forms, we cannot conclusively presume that the strontium is causing the lath form of alpha-SiAlON. This invention accomplishes the incorporation of strontium into the alpha SiAlON phase by combining silicon nitride, aluminum nitride and a multi-cationic mixture including a compound selected from the group consisting of oxides and nitrides of Sr; at least one compound selected from the group consisting of oxides and nitrides of elements which may include Ca, Mg, Li and Na; and at least one compound selected from the group consisting of oxides and nitrides of yttrium or rare earth elements.

The introduction of strontium into the alpha-phase of SiAlON provides an alpha-phase with elongated grains which is morphologically similar to the beta-phase, while providing greater strength at higher temperatures than pure beta-phase SiAlON, without sacrificing toughness.

Further disclosed is a method for producing the multi-phase SiAlON ceramic material. The method includes the steps of preparing a mixture of precursor materials including $Si_3N_4$ and AlN along with a multi-cationic mixture composition which includes (i) a compound selected from the group consisting of oxides and nitrides of Sr; (ii) at least one compound selected from the group consisting of oxides and nitrides of Ca, Mg, Li and Na; and (iii) at least one compound selected from the group consisting of oxides and nitrides of rare earth elements or yttrium. This mixture is attrition milled in a solvent followed by drying and sieving. The mixture is then hot pressed at a pressure of between 155,415 and 310,290 torr and at a temperature of between about 1550° to about 1950° C., in flowing nitrogen, for at least fifteen minutes.

DETAILED DESCRIPTION OF THE INVENTION

Generally, the invention provides a multi-phase SiAlON ceramic material comprising a mixture of at least three phases. These phases include a first phase of alpha-SiAlON having the general formula $M_x(Si,Al)_{1-2}(O,N)_{16}$ wherein $0<x\leq2$ and M is a multi-cationic mixture of (i) a compound selected from the group consisting of oxides and nitrides of Sr; (ii) at least one compound selected from the group consisting of oxides and nitrides of Ca, Mg, Li and Na; and (iii) at least one compound selected from the group consisting of oxides and nitrides of rare earth elements or yttrium. The first phase of alpha-SiAlON has been found to be a crystalline phase existing as fine grains and fine laths. Micrographs taken with an analytical transmission electron microscope (ATEM) or a scanning electron microscope (SEM) reveal that the alpha-phase contains fine elongated grains having a diameter of less than 0.2 micrometers, and fine equiaxed grains having diameters of less than 0.2 micrometers. Chemical analysis by electron microprobe analysis (EMPA) and ATEM indicates that the fine grains were alpha-SiAlON containing strontium.

The second phase of the SiAlON ceramic material includes beta-SiAlON having the general formula $Si_{6-y}Al_yO_yN_{8-y}$ wherein $0<y\leq4.3$. An SEM reveals elongated grains, some of which have a diameter of greater than 1 micrometer, that are determined by EMPA and ATEM to be beta-SiAlON. The weight percent ratio of alpha to beta-SiAlON is preferably from about 10:90 to about 90:10, more preferably from about 20:80 to about 60:40.

The third phase of the multi-phase SiAlON ceramic material comprises an intergranular amorphous morphology phase containing Si, Al, O and N in combination with (i) Sr; (ii) at least one element selected from the group consisting of Ca, Mg, Li, Na; and (iii) at least one element selected from the group consisting of rare earth elements and yttrium. This intergranular amorphous phase has been found to be present in an amount of less than 15% by weight based on the total SiAlON composition weight and preferably present in an amount less than about 10% by weight based on total SiAlON composition weight. The amount is most preferably less than about 5% by weight.

The preferred multi-phase SiAlON ceramic material of the present invention comprises an alpha-SiAlON phase expressed by the chemical formula $M_x(Si,Al)_{1-2}(O,N)_{16}$, where M is a multicationic mixture of SrO, CaO and $Y_2O_3$ and $0<x\leq2$. If the value of x exceeds 2, the M component cannot completely occupy the positions within the crystal lattice in the form of solid solution. Most preferably, x is less than 1.

Similarly, the beta-phase is generally expressed by the chemical formula $Si_{6-y}Al_yO_yN_{8-y}$, wherein $0<y\leq4.3$. The value of y is preferably less than or equal to 4.3 because it appears that compositions of the beta-SiAlON with greater values for y may not exist. Even within the above described range, if the value of y is too large, excessive grain growth results. The excessive grain growth leads, in turn, to the formation of large pores in the resulting materials. The large pores typically lead to a reduction in the strength of the ceramic material. Therefore, the value of y should preferably be larger than 0 but not more than 2, and most preferably, the value of y is less than 1.

It is important to note that one of the novel features of the present invention is the incorporation of strontium into the alpha-phase. This is accomplished by the use of a multi-cationic mixture of (i) a compound selected from the group consisting of oxides and nitrides of Sr; (ii) at least one compound selected from the group consisting of oxides and nitrides of Ca, Mg, Li and Na; and (iii) at least one compound selected from the group consisting of oxides and nitrides of rare earth elements or yttrium. By using this multi-cationic mixture, it has been found that strontium can be incorporated into the alpha-phase. This has been observed to coincide with an alpha-phase which is structurally similar to the beta-phase, as the grain structure of both the alpha and beta-phase contain elongated grains. Because the alpha-phase is similar to the beta-phase, a mixture of alpha- and beta-SiAlON can be substituted for pure beta-phase SiAlON to provide a material having greater strength at higher temperatures than pure beta-phase SiAlON by itself.

In addition, test results have shown that the ceramic body of this invention contains little or no glassy phase. This is important because the presence of a glassy phase in silicon nitride causes the material to fail at high temperatures. By eliminating the glassy phase, a harder, more high temperature resistant material is achieved. The undesirable glassy phase is essentially eliminated by the incorporation of the cationic mixture into the alpha-phase. The presence of the cationic mixture facilitates densification of ceramic materials. This mixture includes an oxide or nitride of Sr, at least one oxide or nitride of Ca, Mg, Li or Na and at least one oxide or nitride of a rare earth element or yttrium. At high temperatures used in hot pressing, a glassy phase forms from the multi-cationic mixture and oxides present on the surface of the aluminum nitride and silicon nitride starting materials. The silicon nitride at least partially dissolves in the glassy phase, then precipitates out as grains of alpha-SiAlON and beta-SiAlON. As alpha-SiAlON forms, it removes components from the glassy phase, thereby reducing the amount of glassy phase present in the resultant product.

The multi-phase ceramic material described herein is prepared by the following method. First, a powder mixture of precursor materials is prepared. The preferred method of preparing the powder mixture includes using an attritor, with zirconia balls as the attritor media, to prepare a finely-dispersed suspension of the following, all weight percentages being based on the combined weight of all the precursor materials. $Si_3N_4$ is present in an amount between about 75 and 98 weight percent in combination with AlN present in an amount between about 0.2 and about 20.0 weight percent, more preferably between about 1.0 and about 10.0 percent by weight, and most preferably between about 2.0 and about 10.0 percent by weight. The $Si_3N_4$ and AlN combination are then mixed with a multi-cationic mixture composition which includes (1) a compound selected from the group consisting of oxides and nitrides of Sr present in an amount between about 0.15 and about 5.0 percent by weight, more preferably in an amount between about 0.20 and 3.0 percent by weight and most preferably between about 0.50 and 2.0 percent by weight; (2) at least one compound selected from the group consisting of oxides and nitrides of Ca, Mg, Li and Na present in an amount between about 0.10 and about 10.0 percent by weight and most preferably in an amount between about 0.2 and about 5.0 percent by weight; and (3) at least one compound selected from the group consisting of oxides and nitrides of yttrium or rare earth elements present in an amount between about 0.1 and about 10.0 percent by weight, and most preferably in an amount between about 0.3 and about 5.0 percent by weight. This mixture of precursor materials is then attrition milled in a solvent or carrier medium for about one hour. The excess carrier medium is removed, by filtration or otherwise. The mixture is then dried and separated from the attritor media to yield a product having the same proportions as the original ingredients.

In a preferred embodiment, a powder mixture of precursor materials was prepared by mixing between about 75 and about 98 weight percent $Si_3N_4$ with AlN present in an amount between about 0.5 and about 20.0 weight percent, SrO present in an amount between 0.5 and 2.0 weight percent, CaO present in an amount between about 0.10 and about 0.50 weight percent and $Y_2O_3$ present in an amount between about 1.0 and about 5.0 weight percent, all weights being based on total weight of precursor materials. Superior properties were achieved.

The preparation of the finely-divided suspension of silicon nitride and the other precursor materials in a carrier medium requires no particular order of addition of the components. For example, it is possible to add the powdered combination or powdered components thereof to a colloidal suspension of silicon nitride in a carrier medium or vice versa. Alternatively, all components of the powder mixture may be added simultaneously to the carrier medium prior to attrition milling. The latter method is preferred, particularly when an organic carrier medium such as toluene or an alcohol is employed.

The carrier medium may be any inorganic or organic compound which is a liquid at room temperature and atmospheric pressure. Examples of suitable carrier media include water; alcohols, such as methanol, ethanol and isopropanol; ketones, such as acetone and methyl ethyl ketone; aliphatic hydrocarbons, such as pentanes and hexanes; and aromatic hydrocarbons, such as benzene and toluene. The carrier medium is desirably an organic liquid, preferably toluene or an alcohol such as methanol. The function of the carrier medium is to impart a viscosity suitable for mixing the solid powders. Any quantity of carrier medium which achieves this purpose is sufficient and acceptable. Preferably, a quantity of carrier medium is employed such that the solids content is in the range from about 15 volume percent to about 50 volume percent. More preferably, a quantity of carrier medium is employed such that the solids content is in the range from about 20 volume percent to about 35 volume percent. Below the preferred lower limit, the viscosity of the solid suspension may be too low and the deagglomeration mixing may be ineffective. Above the preferred upper limit, the viscosity may be too high, and the deagglomeration mixing may be difficult.

If the carrier medium is toluene, a coupling agent, such as an aluminate coupling agent commercially available from Kenrich Petrochemicals under the trade designation KEN-REACT KA 322, may be used to aid in forming a suspension. When using an alcohol such as methanol, a dispersant such as a polyethyleneimine may be used to facilitate mixing and a flocculent such as oleic acid may be used to ease recovery of the powder mixture.

To aid in the dispersion of components of the powder mixture, optionally one or more surfactants or dispersants can be added to the suspension. The choice of surfactant(s) or dispersant(s) can vary widely as is well-known in the art. Any amount of surfactant or dispersant is acceptable providing dispersion of powder mixture components is improved. Typically, the amount of surfactant is in the range from about 0.01 to 2.0 weight percent of the powder mixture.

The components of the powdered combination are added to the carrier medium in any manner which gives rise to a finely dispersed suspension of the components. Typically, the process is conducted in a large vessel at room temperature (taken as 23° C.) under air with vigorous stirring. Any common stirring means is suitable, such as a ball-milling device or an attrition mixer. An ultrasonic vibrator may be used in a supplementary manner to break down smaller agglomerates. The attrition mixer is preferred.

Once mixed, the finely-dispersed suspension is ready for processing into greenware. For example, the suspension can be slip-cast by techniques well-known in the art for eventual sintering. Alternatively, the suspension can be dried into a powder and ground for use in hot-pressing processes. Drying may be accomplished by standard drying means, such as by spray-drying or oven drying. Preferably, drying of the admixture of the powder mixture and the attritor balls is accomplished in an oven under a nitrogen purge after removal of excess carrier medium. During the drying process, additional free carrier medium is removed. The temperature of the drying depends on the boiling point of the carrier medium employed. Typically, the drying process is conducted at a temperature just below the boiling point of the carrier medium under atmospheric pressure. Preferably, the carrier medium is toluene or an alcohol and the temperature of drying is about 50° C.

After drying, the resulting powder is separated from the attritor media or balls and sieved through a screen to obtain a powder having a maximum agglomerate diameter of about 100 μm. The screen size is usually less than about 60 mesh (250 μm); more preferably, less than about 80 mesh (180 μm). The powder which is obtained on sieving is the powder mixture which is used in the hot-pressing process of this invention.

The preferred method of processing the powder mixture is by hot-pressing, which comprises heating the powder under pressure to obtain the densified ceramic body. Any standard hot-pressing equipment is acceptable, such as a graphite die equipped with a heating means and a hydraulic press. Particularly suitable results are obtained when the die is fabricated from a material which is substantially non-reactive with components of the powder mixture at hot-pressing temperatures and has a mean linear coefficient of expansion greater than that of the SiAlON. The hot-pressing may be conducted under an inert atmosphere, such as nitrogen, to prevent the oxidation and decomposition of silicon nitride at high temperatures. The direction of pressing is uniaxial and perpendicular to the plane of the die plates.

Any processing temperature and pressure will suffice providing the novel SiAlON ceramic of this invention, described herein, is obtained. Typically, however, the temperature is between about 1550° and 1950° C. Preferably, the temperature is maintained in the range from about 1750° C. to about 1870° C. during pressurizing. More preferably, the temperature is maintained in the range from about 1800° C. to about 1850° C. Most preferably, the temperature is maintained in the range from about 1820° C. to about 1840° C.

It is noted that the accurate measurement of high temperatures, such as those quoted hereinabove, is technically difficult. Some variation in the preferred temperature range may be observed depending on the method employed in measuring the temperature. The preferred temperatures of this invention are measured by a tungsten-rhenium thermocouple, obtained from and calibrated by the Omega Company.

While the pressure during hot-pressing is important, it is not quite as critical a parameter as the temperature. Typically, the pressure should be sufficient to cause densification of the green body. Preferably, the pressure should be in the range of from about 155,415 torr (20.7 mPa) to about 310,290 torr (41.4 mPa); more preferably, from about 206,860 torr (206,860 too (27.6 mPa) to about 284,432 torr (37.9 mPa); and most preferably, about 232,717 torr (31.0 mPa) to about 268,918 torr (35.8 mPa). Below the preferred lower pressure limit, it does not appear that the powder will be sufficiently densified. Above the preferred upper pressure limit, the powder will densify in a shorter time and at a lower temperature.

The amount of time that the powder mixture is heated under pressure should be sufficient to bring the powder to essentially complete densification. Generally, ram movement is a good indicator of the extent of densification. As long as the ram continues to move, the densification is incomplete. When the ram has stopped moving for at least about 15 minutes, the densification is essentially complete at about 99 percent or greater of the theoretical value. Thus, the time required for hot-pressing is the time during ram movement plus about an additional 15 to 30 minutes. Preferably, the time is in the range from about 15 minutes to about 5 hours; more preferably, from about 30 minutes to about 90 minutes; and most preferably, about 45 minutes to about 75 minutes.

The hot-pressing method of densification, described hereinbefore, allows for the formation of SiAlON ceramic articles which can be used as cutting tools and engine components, particularly high wear and high temperature components. A variety of shapes can be made by hot-pressing, one common shape being a flat plate. These plates may range in size from about 2 inches in length by about 1.5 inches in width by about 0.45 inch in thickness to about 16 inches (40.6 cm) in length by about 16 inches (40.6 cm) in width by about 1.0 inch (2.5 cm) in thickness. Smaller and larger plates can also be fabricated, as determined by the size of the hot-pressing plaques. Cutting tools can be fabricated by slicing and grinding these plates into a variety of cutting tool shapes.

The SiAlON ceramic body which is produced by the hot-pressing process of this invention is a dense material having no significant porosity. Preferably, densification proceeds to greater than 95 percent of the theoretical value; more preferably, to greater than 97 percent of the theoretical value; and most preferably, to greater than 99 percent of the theoretical value.

Moreover, as measured by X-ray diffraction, SiAlON samples made by the above method were shown to exist in alpha- and beta-SiAlON phases. The presence of large, elongated grains, fine elongated grains and fine equiaxed grains was determined by scanning electron microscope. Quite unexpectedly, the alpha-phase SiAlON was found to be present as elongated grains similar to the elongated beta-phase SiAlON grains, as determined by transmission electron microscopy (TEM) and EMPA.

Prior to testing, a test sample was polished in a special manner. First, the sample was cleaned and rough spots were flattened by use of a 220-grid diamond wheel. Next, a 45-micrometer diamond wheel was used to start the polishing. Next, the sample was treated to a series of polishings at 30 psi and 200 rpm in the following consecutive manner: three five-minute intervals with 30-micrometer diamond paste, three five-minute intervals with 15-micrometer diamond paste, three five-minute intervals with 6-micrometer diamond paste, two five-minute intervals with 1-micrometer diamond paste, and one five-minute interval with 0.25-micrometer diamond paste. Between each interval, the sample was thoroughly cleansed by washing with water and sonicating for two minutes. The Vickers hardness number of the SiAlON of this invention was at least about 1650 kg/mm$^2$ at room temperature. As shown in Table 1, exceptionally high hardness values above 1700 kg/mm$^2$, are obtainable with this invention. Preferably, the Vickers hardness number ranges from about 1650 kg/mm$^2$ to about 1985 kg/m$^2$ at room temperature; more preferably, from about 1750 kg/mm$^2$ to about 1985 kg/mm$^2$.

The mechanical properties of the SiAlON ceramic body are readily measured by use of standard tests. These values are set forth in Table 1 for the examples of SiAlON compositions following herein. In particular, materials are evaluated for hardness, Palmqvist toughness, fracture strength and fracture toughness. These tests are described hereinafter. In the evaluation of cutting tool materials and engine or pump materials, it is useful to measure the Vickers hardness and the Palmqvist toughness. Both measurements can be made simultaneously on one test sample after preparation as described above, and therefore these tests are very convenient.

The Vickers hardness test measures the resistance of the ceramic material to indentation. A sample, approximately 1 cm in length by 1 cm in width by 1 cm in height, is placed on a flat surface, and indented with a standard Vickers diamond indentor at a crosshead speed of 0.02 in/min. The Vickers hardness number is calculated from the applied load, in this case 14 kg, and the cross-sectional area of the indentation.

The Palmqvist toughness test is an extension of the Vickers test. (See S. Palmqvist in Jerndontorets Annalen, 141 (1957), 300, for a description of the Palmqvist toughness test.) The test sample was prepared and indented as in the Vickers test, but the 14-kg load was additionally held for 15 seconds. The sample cracked. The measurements of the indented diagonals and the crack lengths were made on a Nikon UM2 microscope at 1000× magnification. The Palmqvist toughness (W) is directly proportional to the applied load (P) and inversely proportional to the crack length (L). Preferably, the SiAlON body of this invention exhibits a Palmqvist toughness at room temperature of at least about 28 kg/mm. Preferably, the ceramic body of this invention exhibits a Palmqvist toughness at room temperature in the range from about 28 kg/mm to about 45 kg/mm; more preferably, from about 32 kg/mm to about 45 kg/mm.

Fracture toughness measures the resistance of the material to fracture under a dynamic load. More specifically, fracture toughness is defined as the maximum amount of energy which a unit volume of material will absorb without fracture. In the present invention two methods were employed to measure fracture toughness. The first of these was the Chevron notch test. Test bars were prepared as described hereinabove, and additionally scored with a Chevron notch. The test bars were then subjected to a 3-point bend test with 40 mm span and a crosshead speed of 1.0 $\mu$/min. As shown in Table 1, the fracture toughness of the SiAlON ceramic body of this invention, as measured at room temperature (23° C.) by the Chevron notch technique, is greater than about 4.5 MPa (m)$^{\frac{1}{2}}$. The room temperature fracture toughness generally ranges from about 4.5 MPa (m)$^{\frac{1}{2}}$ to about 6.5 MPa (m)$^{\frac{1}{2}}$. Preferably, the room temperature fracture toughness is greater than about 5.5 MPa (m)$^{\frac{1}{2}}$; and more preferably, greater than about 6 MPa (m)$^{\frac{1}{2}}$.

Fracture strength (modulus of rupture) measures the resistance of the material to fracture under a steady load. Fracture strength is defined as the maximum unit stress which the material will develop before fracture occurs. Test bars are prepared by cutting rectangular bars (45 mm×4 mm×3 mm) of the SiAlON ceramic in a plane perpendicular to the pressing direction. The bars are ground on the surfaces parallel to the pressing plates using a 500 grit grinding wheel (Military Standard 1974). The fracture strength is measured at room temperature using a 4-point bend test with 20 mm span and crosshead speed of 0.5 mm/min. Typically, the fracture strength at room temperature is at least about 650 MPa. Preferably, the fracture strength at room temperature ranges from about 825 MPa to about 1250 MPa; more preferably, from about 850 MPa to about 950 MPa. High temperature strength is measured using a 4-point bend test with 20 mm span and crosshead speed of 0.5 mm/min. Typically, at 1200° C. the fracture strength is at least about 650 MPa. Typically, at 1375° C. the fracture strength is at least about 350 MPa.

Physical properties of the SiAlON composites can be altered by changing the ratio of the alpha and beta-SiAlON phases. Optimum Palmqvist toughness was obtained using a ratio of alpha to beta-phase of about 20:80. However, toughness decreased and the hardness of the material increased in the samples containing a higher percentage of alpha-phase. The material provides excellent hardness at high temperatures unknown in most ceramic materials, without sacrificing toughness and strength. The ratio of alpha-SiAlON to beta-SiAlON of between about 20:80 and about 60:40 gives excellent values for hardness. These values are set forth in Table 1. At these ratios, the hardness values exceed 1900 kilograms/mm$^2$ in each instance. These results are set forth in Table 1. The following is the calculated $\alpha/\beta$ ratio of the SiAlON composites.

| Nominal | Calculated* |
|---------|-------------|
| 100/0 | 100/0 |
| 60/40 | 84/16 |
| 50/50 | 70/30 |
| 40/60 | 56/44 |
| 30/70 | 50/50 |
| 20/80 | 21/79 |
| 10/90 | 0/100 |

*Based on $\dfrac{\alpha(102) + \alpha(201)}{[\alpha(102) + \alpha(201)] + [\beta(101) + \beta(201)]}$ Where $\alpha(102)$, $\alpha(201)$, $\beta(101)$ and $\beta(201)$ are peak heights measured from X-ray diffraction patterns.

Thus, there is provided in accordance with the present invention, a multi-phase SiAlON ceramic material having at least a first, second and third phase comprising an alpha-phase containing strontium, a beta-phase, and an intergranular amorphous phase containing strontium, respectively. This multi-phase SiAlON material exhibits strength and toughness at high temperatures and provides an excellent material for wear and high temperature applications such as cutting tools and parts in pumps and engines.

The following examples serve to illustrate the novel, multi-phase SiAlON material of this invention, the method of preparing the novel SiAlON material and the physical properties of the composition. The examples are not intended to be limiting of the scope of this invention. All percentages are by weight unless otherwise noted. A summary of the physical properties of Examples 1-7 is set forth in Table 1.

| EXAMPLE 1 | |
|-----------|---|
| Compound | Amount Wt % |
| Si$_3$N$_4$ | 97.99 |
| AlN | 1.26 |

-continued

| EXAMPLE 1 | |
|---|---|
| Compound | Amount Wt % |
| Y$_2$O$_3$ | .32 |
| SrO | .18 |
| CaO | .25 |
| Total | 100.00 |

A mixture of the compounds set forth herein above, in the amounts indicated, was attrition milled with ZrO$_2$ media in methanol for 2 hours to form a powder mixture and was then dried, sieved and stored. About 80 grams of the powder mixture was hot pressed at 5,000 psi into a 0.5"×1.5×2" billet at 1825° C., for 1 hour in flowing nitrogen. The billet was fully dense with a density of 3.24 g/cc measured by water immersion. An alpha to beta ratio of 10:90 was obtained.

| Example 2 | |
|---|---|
| Compound | Amount Wt % |
| Si$_3$N$_4$ | 95.33 |
| AlN | 2.85 |
| Y$_2$O$_3$ | 1.01 |
| SrO | 0.56 |
| CaO | 0.25 |
| Total | 100.00 |

A mixture of the compounds set forth hereinabove in the amounts indicated were attrition milled and hot pressed as in Example 1. A billet density was measured at 3.22 grams/cc. X-ray diffraction showed both alpha and beta-SiAlON. An alpha to beta ratio of 20:80 was obtained.

| EXAMPLE 3 | |
|---|---|
| Compound | Amount Wt % |
| Si$_3$N$_4$ | 92.86 |
| AlN | 4.31 |
| Y$_2$O$_3$ | 1.66 |
| SrO | 0.92 |
| CaO | 0.25 |
| Total | 100.00 |

A mixture of the compounds set forth hereinabove in the amounts indicated were attrition milled and hot pressed as in Example 1. An alpha to beta ratio of 30:70 was obtained.

| EXAMPLE 4 | |
|---|---|
| Compound | Amount Wt % |
| Si$_3$N$_4$ | 90.29 |
| AlN | 5.84 |
| Y$_2$O$_3$ | 2.33 |
| SrO | 1.29 |
| CaO | 0.25 |
| Total | 100.00 |

A mixture of the compounds set forth hereinabove in the amounts indicated were attrition milled and hot pressed as in Example 1. An alpha to beta ratio of 40:60 was obtained.

| Example 5 | |
|---|---|
| Compound | Amount Wt % |
| Si$_3$N$_4$ | 87.71 |
| AlN | 7.38 |
| Y$_2$O$_3$ | 3.0 |
| SrO | 1.66 |
| CaO | 0.25 |
| Total | 100.00 |

A mixture of the compounds set forth hereinabove in the amounts indicated were attrition milled and hot pressed as in Example 1. An alpha to beta ratio of 50:50 was obtained. This sample demonstrated a surface hardness of 1931 Kg/mm$^2$.

| EXAMPLE 6 | |
|---|---|
| Compound | Amount Wt % |
| Si$_3$N$_4$ | 85.14 |
| AlN | 8.91 |
| Y$_2$O$_3$ | 3.67 |
| SrO | 2.03 |
| CaO | 0.25 |
| Total | 100.00 |

A mixture of the compounds set forth hereinabove in the amounts indicated were attrition milled and hot pressed as in Example 1. An alpha to beta ratio of 60:40 was obtained.

| EXAMPLE 7 | |
|---|---|
| Compound | Amount Wt % |
| Si$_3$N$_4$ | 74.79 |
| AlN | 15.06 |
| Y$_2$O$_3$ | 6.38 |
| SrO | 3.52 |
| CaO | 0.25 |
| Total | 100.00 |

A mixture of the compounds set forth hereinabove in the amounts indicated were attrition milled and hot pressed as in Example 1. An alpha to beta ratio of 100:0 was obtained.

X-ray diffraction showed both alpha and beta-phases present in the samples. SEM showed 3 kinds of grains (1) large, elongated grains (diameter>1 μm); (2) fine, elongated grains (diameter <0.2 μm); and (3) an intergranular amorphous phase. EMPA and ATEM indicated that the large grains were beta-SiAlON and the two fine grains were alpha-SiAlON containing Y, Sr and Ca. SEM also showed about 5 to 6 volume percent of the intergranular amorphous phase consisting mainly of Si, Ca, Al, Y, Sr, O and N.

TABLE 1

| Properties of α/β SiAlON composites prepared by hot pressing at 1825° C.-1 h | | | | | | | |
|---|---|---|---|---|---|---|---|
| Example | 1 | 2 | 3 | 4 | 5 | 6 | 7 |
| Ratio of α/β (wt %) | 10/90 | 20/80 | 30/70 | 40/60 | 50/50 | 60/40 | 100/0 |
| Density (gm/cc) | 3.205 | 3.221 | 3.221 | 3.241 | 3.242 | 3.257 | 3.313 |
| Hardness (Kg/mm$^2$) | 1737 ± 36 | 1727 ± 21 | 1982 ± 20 | 1921 ± 52 | 1931 ± 0 | 1985 ± 41 | 1831 ± 45 |
| Toughness (Kg/mm) | 28.1 ± 0.7 | 45.2 ± 1.6 | 33.3 ± 0.6 | 33.2 ± 1.2 | 32.0 ± 0.5 | 28.4 ± 1.0 | 28.8 ± 2.0 |
| Fracture Toughness K$_{IC}$ = (MPa(m)$^{\frac{1}{2}}$) | | 6.2 | | | 4.8 | | |

TABLE 1-continued

| | Properties of α/β SiAlON composites prepared by hot pressing at 1825° C.-1 h | | | | | | |
|---|---|---|---|---|---|---|---|
| Example | 1 | 2 | 3 | 4 | 5 | 6 | 7 |
| Ratio of α/β (wt %) | 10/90 | 20/80 | 30/70 | 40/60 | 50/50 | 60/40 | 100/0 |
| Fracture Strength (MPa) | | | | | | | |
| @ 25° C. | | 902 ± 76 | | | 680 ± 118 | | |
| @ 1200° C. | | 755 ± 97 | | | 521 ± 89 | | |
| @ 1375° C. | | 519 ± 87 | | | 365 ± 16 | | |
| XRD phase[2] | β | α, β | α, β | α, β | α, β | α, β | α |

[1]α/β are the respective weight percents of α and β-phase materials in the SiAlON composite.
[2]α: α-SiAlON; β: β-SiAlON.

Therefore, from the results of Examples 1-7 as shown on Table it can be seen that the fracture toughness and fracture strength compare very favorably with prior art materials. The material of the present invention therefore provides a ceramic material which exhibits high hardness, excellent strength at elevated temperatures, and good oxidation and creep resistance. The present material may have these superior properties due to the inclusion of the strontium in the alpha-phase of the SiAlON, as well as in the intergranular amorphous morphology. This inclusion seems to yield a material which has superior properties over prior art materials.

While our invention has been described in terms of specific embodiments, it will be appreciated that other embodiments could readily be adapted by one skilled in the art. Accordingly, the scope of the invention is to be limited only by the following claims.

What is claimed is:

1. A multi-phase SiAlON ceramic material having at least a first, second and third phase, comprising:
   (a) a first phase of alpha-SiAlON having the general formula $M_x$, $(Si,Al)_{12}$ $(O,N)_{16}$, wherein $0 < x \leq 2$ and M is a multi-cationic mixture of (i) a compound selected from the group consisting of oxides and nitrides of Sr; (ii) at least one compound selected from the group consisting of oxides and nitrides of Ca, Mg, Li and Na; and (iii) at least one compound selected from the group consisting of oxides and nitrides of rare earth elements or yttrium;
   (b) a second phase of beta-SiAlON having the general formula $Si_{6-y}Al_yO_yN_{8-y}$, wherein $0 < y \leq 4.3$; and
   (c) a third phase of an intergranular amorphous morphology containing Si, Al, O, and N, combined with a mixture of (i) a compound selected from the group consisting of oxides and nitrides of Sr; (ii) at least one compound selected from the group consisting of oxides and nitrides of Ca, Mg, Li and Na; and (iii) at least one compound selected from the group consisting of oxides and nitrides of rare earth elements or yttrium,
   such that said ceramic material exhibits high hardness, excellent strength at elevated temperatures and good oxidation resistance.

2. The ceramic material of claim 1, wherein $0 < y < 1$.

3. The ceramic material of claim 1, wherein the intergranular amorphous phase is present in an amount greater than 0 and less than about 15 percent by volume based upon total material volume.

4. The ceramic material of claim 3, wherein the intergranular amorphous phase is present in an amount greater than 0 and less than about 10 percent by volume based upon total material volume.

5. The ceramic material of claim 1, wherein the weight ratio of alpha-SiAlON to beta-SiAlON is from about 10:90 to about 90:10.

6. The ceramic material of claim 1, wherein the weight ratio of alpha-SiAlON to beta-SiAlON is between about 20:80 and about 60:40.

7. The ceramic material of claim 1, wherein the first phase of alpha-SiAlON having the general formula $M_x(Si,Al)_{12}(O,N)_{16}$, where M is a multicationic mixture of (i) oxides and nitrides of Sr present in an amount between about 0.15 and about 5.0 percent by weight; (ii) at least one compound selected from the group consisting of oxides and nitrides of Ca, Mg, Li and Na, present in an amount between about 0.10 and about 10.0 percent by weight; and (iii) at least one compound selected from the group consisting of oxides and nitrides of rare earth elements or yttrium present in an amount between about 0.1 and about 10.0 percent by weight.

8. The ceramic material of claim 1, wherein the first phase includes alpha-SiAlON with a formula of $M_x(Si,Al)_{12}(O,N)_{16}$, wherein M is a mixture of SrO, CaO, and $Y_2O_3$ and $0 < x \leq 2$.

9. The ceramic material of claim 1, wherein the alpha-SiAlON phase includes fine elongated grains and fine equiaxed grains both having diameters of less than 0.2 μm.

10. The ceramic material of claim 1, wherein the fracture strength of the material is at least 350 MPa at 1375° C. in air.

11. The ceramic material of claim 1, wherein the hardness of the material is at least 1700 $Kg/mm^2$ at room temperature.

12. A method of producing a SiAlON ceramic material having at least a first, second and third phase comprising the steps of:
   (a) preparing a mixture of precursor materials including $Si_3N_4$ present in an amount between about 75 and about 98 weight percent based on total weight of precursor materials together with AlN, and a multicationic mixture composition which includes (i) a compound selected from the group consisting of oxides and nitrides of Sr; (ii) at least one compound selected from the group consisting of oxides and nitrides of Ca, Mg, Li, and Na; and (iii) at least one compound selected from the group consisting of oxides and nitrides of yttrium or rare earth elements;
   (b) attrition milling the mixture with attritor media in solvent followed by drying and separating the mixture from the attritor media; and
   (c) hot pressing the mixture at a pressure of between about 3,000 and about 6,000 psi and at a temperature of between about 1550° C. to about 1950° C. for at least 15 minutes,
   whereby an alpha-SiAlON phase is formed which includes fine elongated grains and fine equiaxed grains both having diameters of less than 0.2 μm and both elongated and equiaxed grains containing Sr, Ca and Y; and whereby a beta-SiAlON phase is formed which includes large elongated grains having a diameter less than 2.0 μm; and an intergranular amorphous phase is formed containing Si, Al, Y, Sr, Ca, O and N.

13. The method of claim 12, wherein the step of preparing a mixture of precursor materials is accomplished by utilizing AlN an amount between about 0.5 and about 20 weight percent based on total weight of precursor materials.

14. The method of claim 12, wherein the step of preparing a mixture of precursor materials is accomplished by utilizing AlN an amount between about 1.0 and about 10 weight percent based on total weight of precursor materials.

15. The method of claim 12, wherein the step of preparing a mixture of precursor materials is accomplished by mixing $Si_3N_4$ and AlN with the compound selected from the group consisting of oxides and nitrides of Sr present in an amount between about 0.15 and about 5.0 percent by weight based on total weight of precursor materials.

16. The method of claim 12, wherein the step of preparing a mixture of precursor materials is accomplished by mixing $Si_3N_4$ and AlN with the compound selected from the group consisting of oxides and nitrides of Sr present in an amount between about 0.20 and about 3.0 percent by weight based on total weight of precursor materials.

17. The method of claim 12, wherein the step of preparing a mixture of precursor materials is accomplished by mixing $Si_3N_4$ and AlN with at least one compound selected from the group consisting of oxides and nitrides of Ca, Mg, Li, Na present in an amount between about 0.10 and about 10.0 percent by weight based on total weight of precursor materials.

18. The method of claim 11, wherein the step of preparing a mixture of precursor materials is accomplished by mixing $Si_3N_4$ and AlN with at least one compound selected from the group consisting of oxides and nitrides of yttrium or rare earth elements and mixtures thereof present in an amount between about 0.1 and about 10.0 percent weight based on total weight of precursor materials.

19. The method of claim 12, wherein the step of preparing a mixture of precursor materials is accomplished by mixing $Si_3N_4$ and AlN, said AlN being present in an amount between about 1.0 and about 10 percent by weight based on the total weight of precursor materials with (i) a compound selected from the group consisting of SrO and $Sr_3N_2$ wherein the compound is present in an amount between about 0.50 and 2.0 percent by weight based on total precursor material weight; (ii) a compound selected from the group consisting of oxides and nitrides of Ca, Mg, Li, and Na is present in an amount between 0.5 and 5.0 percent by weight based on total precursor material weight; and (iii) a compound selected from the group consisting of oxides and nitrides of yttrium or rare earth metals present in an amount between about 0.3 and about 5.0 percent by weight based on total weight of precursor materials, the balance being $Si_3N_4$.

20. The method of claim 12, wherein the step of preparing a mixture of precursor materials is accomplished by mixing $Si_3N_4$ with AlN, said AlN being present in an amount between about 1.0 and about 10.0 weight percent based upon total precursor material weight with (i) SrO present in an amount between about 0.50 and 2.0 weight percent based on total precursor material weight; (ii) CaO present in an amount between about 0.50 and about 5.0 weight percent based upon total precursor material weight; and (iii) $Y_2O_3$ present in an amount between about 0.3 and about 5.0 weight percent based upon total weight of precursor materials, the balance being $Si_3N_4$.

* * * * *